2,903,364
Patented Sept. 8, 1959

2,903,364

PROCESS FOR IMPROVING THE TASTE AND FLAVOR OF MARGARINE AND OTHER FOODS AND EDIBLE SUBSTANCES

Nils Gunnar Wode and Ulla Holm, Bromma, Sweden, assignors to Margarinbolaget Aktiebolag, Bromma, Sweden, a corporation of Sweden No Drawing. Application November 28, 1955
Serial No. 549,574

Claims priority, application Sweden December 2, 1954

2 Claims. (Cl. 99—123)

The invention is for a process for producing a taste or flavor similar to that of butter in margarine and other fat-containing foods or edible sustances, or for improving such taste or flavor if already present.

It has been known for a long time that diacetyl constitutes one of the most important flavorings of cultured butter. The diacetyl has therefore been used in order to produce a taste and flavor similar to that of butter in foods of various kinds but above all in margarine. In some cases margarine is prepared with the aid of cultured milk which contains diacetyl. In spite of the fact that diacetyl and other flavoring substances characteristic of butter have been added there has, however, always been recognisable a distinct difference as to the taste between margarine and butter.

It has been found by us, as the result of careful analysis of cream and butter, that milk fat contains compounds of aliphatic lactone type having different numbers of carbon atoms in the molecule, from and including 10 up to and including 18, perhaps even more. The addition of such lactones and other lactones to margarine and other foods has been found to give margarine a taste and flavor very similar to that of butter and to give also other fat-containing foods the typical taste of butter fat.

Lactones having a comparatively low number of carbon atoms in the molecule are liquids at ordinary temperatures, whereas lactones having a higher number of carbon atoms, for example 18, are solids. The lactones, particularly in the "technically" pure state, have distinct flavors. Often the flavor is to a great extent refined by purification. For this reason it is preferable to use pure and if possible newly distilled or recrystallized lactones which have been found to give better results than lactones which have been stored for some time.

When butter or butterfat is stored the lactones may decompose or they may react with other components of the butter or the butter fat. Particularly low-molecular lactones having from 4 to 8 carbon atoms in the molecule seem inclined to react while forming substances having the taste of old butter.

Adding such low-molecular lactones in suitable quantities to foods produces a taste and flavor in the fresh product which is similar to that of butter, but the durability of the taste is rather limited.

If lactones having from and including 8 to and including 14 carbon atoms in the molecule are added the products obtained are somewhat better as regards the durability of the taste than those to which have been added lactones having a lower number of carbon atoms in the molecule.

Considerably better results can, however, be obtained by using lactones having an even higher number of carbon atoms. It has been found that aliphatic lactones having from and including 16 to and including 22 carbon atoms in the molecule are markedly effective for frying and melting purposes and at high temperatures in general. The flavor and taste produced by the use of these lactones have also been found to be more durable. They have also been found to render the flavor of diacetyl in margarine as well as on the tongue more permanent and also prevent the assertion of such tastes in the margarine which are derived from the fats as the result of flavor reversion and similar processes.

Lactones having from and including 4 to and including 14 carbon atoms should be used in very small quantities of less than 1 gram per ton, in any case not more than 2 grams per ton. On the other hand, lactones having from and including 16 up to and including 22 carbon atoms have the advantage that as a result of a less intensive flavor and taste they can be used in considerably larger amounts, for example from 2 up to 20 grams or even more per ton. This has the advantage that a very effective fixation of the taste is made possible similar to that of butter.

The stearolactone (18) has been found particularly effective, either alone or in combination with other lactones. If stearolactone is used alone in quantities of from 5 up to 20 milligrams or more per kilogram a margarine product is obtained, the taste and flavor of which is very durable. The flavor of the product, if the stearolactone is pure, is weak at low temperatures but may be strengthened by adding diacetyl, esters, low-molecular lactones, aldehydes or ketones, volatile acids and other substances, and the result obtained in this way is more durable than when using low-molecular lactones alone which cause a relatively rapid deterioration of the flavor as well as the taste of the product.

It has been found particularly advantageous to use certain combinations of lactones. As an example of such a suitable combination may be mentioned a lactone having a low carbon number (up to and including 14) and a lactone having a high carbon number (from and including 16). Adding such a combination to margarine confers flavor at low temperatures and the flavor remains under melting and frying conditions. The durability of the taste and flavor is greater than when only lactones having a low number of carbon atoms are used. Particularly suitable is a combination of the decalactone (10) and the stearolactone. In this combination the decalatone can be replaced by the nonyllactone (9) plus the undecalactone (11).

In order for the fat to keep well it is of importance to provide for a hydrogen ion concentration of the margarine or other fat-containing products of a pH equal to or higher than 5.5. The lactones, however, decompose the more rapidly the higher the pH-value is. The high-molecular lactones are decomposed more slowly than the low molecular lactones, particularly in the presence of fat, and the products obtained by the use of these lactones are therefore more durable also at a pH-value of 5.5 or more.

The lactones may be dissolved in fat or oil and the oil or fat admixed with the margarine or other product the taste or flavor of which is to be improved.

The total amount of lactones to be used is of the order of 1 to 50 milligrams per kilogram of the finished product. In most cases the amounts used will be of the order of about 1 to 25 milligrams per kilogram. As a rule the flavor is not fully developed until after a few days of storing.

Example 1

In a churn or premixer 900 kilograms of fat mixture were mixed with the aqueous phase described below. The fat mixture consisted of 25% rape seed oil, 45% coconut oil, 20% hardened whale oil having a melting point of 40–42° C. and 10% hardened rape seed oil having a melting point of 40–42° C. In the fat mixture was dissolved 4 kilograms of monoglyceride and 3 kilograms of lecithin. The temperature of the fat mixture when introduced into the churn was about 45° C.

The aqueous phase had a temperature of about 15° C. and consisted of 115 kilograms of pasteurized and cultured milk, 55 kilograms of water, 17 kilograms of salt (2.8 kilograms of potato meal), 1.1 kilograms of sodium benzoate, 0.150 kilogram of sodium bicarbonate, and 1.0 gram of diacetyl.

After completion of the mixing there was added 0.750 kilogram of vitamin oil containing 40,000 I.U. of vitamin A and 2,300 I.U. of vitamin $D_2$ per gram, and 0.560 kilogram of carotin oil containing 7,000 I.U. of carotin per gram. After mixing there was added an aroma preparation consisting of 2.5 grams of decalactone and 10 grams of stearolactone dissolved in 200 grams of oil. The mixing was continued for a few minutes and the batch was then pumped to a chilled roll. The chilled emulsion was then supplied to a complector and then put up in packets.

The result was a product having excellent taste and flavor similar to that of butter. The flavor developed only after a few days.

*Example 2*

The procedure described in Example 1 was repeated except that as aromatizing substances were used 0.9 gram of nonyllactone, 1.2 grams of undecalactone, and 12 grams of stearolactone, per tone of the finished product.

*Example 3*

The procedure described in Example 1 was repeated except that as aromatizing substances were used 1.5 grams of decalactone, 1.0 gram of dodecalactone, and 10 grams of stearolactone, per ton of the finished product.

*Example 4*

The procedure described in Example 1 was repeated except that as aromatizing substances were used 0.25 gram of nonyllactone, 1.6 grams of decalactone, 0.50 gram of undecalactone, and 10 grams of stearolactone per ton of the finished product.

*Example 5*

The procedure described in Example 1 was repeated except that as aromatizing substances were used 12 grams of stearolactone alone, per ton of the finished product. In this case the flavor was not particularly pronounced at ordinary temperature but the taste was excellent and the frying flavor agreeable. As in the preceding examples it was found that pastry made with this margarine had an agreeable butter flavor and retained this flavor also after storing.

*Example 6*

Artificial cream was made in the following way.

1 kilogram of margarine, to which had been added emulsifying agents for cream whipping, was molten and had added thereto 0.25 milligram of nonyllactone, 2.5 milligrams of decalactone, 0.5 milligram of undecalactone and 10 milligrams of stearolactone. 2 liters of milk were then added and mixed with the margarine and the mixture was then passed through a homogenizer. The artificial cream thus obtained had good taste and was free from the extraneous taste characteristic of the ordinary artificial cream.

The lactones used in the above examples were in most cases γ-lactones, in some cases δ- and ε-lactones.

The invention is not limited to the amounts of aromatizing substances stated in the examples. As a rule a more pronounced flavor in the fresh food is obtained at ordinary temperature if the concentration of the low-molecular lactones up to and including 14 is increased. On the other hand, the intensity of the taste is not increased in proportion to the concentration of the lactones, and this is particularly the case if the lactones are pure and of the high-molecular kind.

The invention is not limited to the treatment of margarine. As examples of other substances which in the manner described may be given the taste and flavor of butter and cream or the taste and flavor of which may be improved in this respect or in other ways made more agreeable may be mentioned other fat emulsions such as fat-containing auxiliary baking agents, artificial cream, mayonnaise, pastry, cakes, and aromas for these and similar fat-containing dietary products.

In addition to the lactones other substances may be added, for example diacetyl and the reduction products thereof, esters, aldehydes and ketones, fatty acids, volatile acids, lactic acid, scatol, indol and other substances, with the object of imitating the taste of butter, farmer's butter, clover butter and so on. The lactones serve for fixation of the taste and flavor of these additives.

What we claim is:

1. As a new composition of matter, a fat-containing food, at least one non-substituted saturated aliphatic lactone having from 16 to 22 carbon atoms per molecule and from 4 to 6 carbon atoms in the ring, and at least one non-substituted saturated aliphatic lactone having from 4 to 14 carbon atoms per molecule and from 4 to 6 carbon atoms in the ring, the content of said lactone having from 16 to 22 carbon atoms per molecule being from 2 to 20 grams per ton and the content of said lactone having from 4 to 14 carbon atoms per molecule being from about 1 to 2 grams per ton.

2. As a new composition of matter, a fat-containing food, at least one non-substituted saturated aliphatic lactone having from 18 to 22 carbon atoms per molecule and from 4 to 6 carbon atoms in the ring, and at least one non-substituted saturated aliphatic lactone having from 4 to 14 carbon atoms per molecule and from 4 to 6 carbon atoms in the ring, the content of said lactone having from 18 to 22 carbon atoms per molecule being substantially greater than that of said lactone having from 4 to 14 carbon atoms per molecule, the total content of said lactones in the composition being from 1 gram to 50 grams per ton of the fat-containing food.

References Cited in the file of this patent

UNITED STATES PATENTS

| | | |
|---|---|---|
| 1,799,536 | Ruzicka | Apr. 7, 1931 |
| 1,816,800 | Van Viel | July 28, 1931 |
| 2,023,877 | Epstein et al. | Dec. 10, 1935 |
| 2,819,169 | Boldingh | Jan. 7, 1958 |

FOREIGN PATENTS

| | | |
|---|---|---|
| 301,750 | Great Britain | June 4, 1930 |